United States Patent
Nighswander et al.

(10) Patent No.: US 11,524,415 B2
(45) Date of Patent: Dec. 13, 2022

(54) BOOM ARM FOR POSITIONING AN AUXILIARY ELECTRICAL DEVICE

(71) Applicant: Swivel-Link, LLC, Hicksville, OH (US)

(72) Inventors: Anthony R. Nighswander, Hicksville, OH (US); Chad A. Sprow, Continental, OH (US); Roger W. Sanders, Antwerp, OH (US); Travis G. Hughes, Antwerp, OH (US)

(73) Assignee: Swivel-Link, LLC, Hicksville, OH (US)

( * ) Notice: Subject to any disclaimer, the term of this patent is extended or adjusted under 35 U.S.C. 154(b) by 917 days.

(21) Appl. No.: 16/373,851

(22) Filed: Apr. 3, 2019

(65) Prior Publication Data

US 2020/0316792 A1 Oct. 8, 2020

(51) Int. Cl.
*B25J 17/02* (2006.01)
*B25J 18/04* (2006.01)
*B25J 18/02* (2006.01)

(52) U.S. Cl.
CPC ......... *B25J 17/0275* (2013.01); *B25J 18/025* (2013.01); *B25J 18/04* (2013.01)

(58) Field of Classification Search
CPC .... B25J 17/0275; B25J 18/025; B25J 118/04; B25J 15/0616
See application file for complete search history.

(56) References Cited

U.S. PATENT DOCUMENTS

| | | | | |
|---|---|---|---|---|
| 4,151,971 A * | 5/1979 | Daly | ................... | F16M 13/025 248/286.1 |
| 5,410,944 A * | 5/1995 | Cushman | ................... | B25J 9/14 901/29 |
| 5,769,369 A * | 6/1998 | Meinel | ................... | B60N 3/001 248/176.1 |
| 6,585,201 B1 * | 7/2003 | Reed | ................... | F16M 13/02 248/917 |
| 9,415,520 B2 * | 8/2016 | Sanders | ............... | B25J 17/0275 |
| 2005/0088812 A1 * | 4/2005 | Hillman | ................ | F16M 11/40 248/278.1 |
| 2007/0201197 A1 * | 8/2007 | Hillman | ................ | F16M 11/40 361/679.06 |
| 2008/0164232 A1 * | 7/2008 | Smith | .................. | F16M 13/025 211/87.01 |

(Continued)

*Primary Examiner* — Zakaria Elahmadi
(74) *Attorney, Agent, or Firm* — Taylor IP, P.C.

(57) ABSTRACT

A boom arm assembly includes an anchoring portion for attachment to an anchoring surface, and a mounting portion for attachment to an auxiliary electrical device. A telescoping link includes an elongate outer member and an elongate inner member. The outer member has a first distal defining a ball joint which is connected to the anchoring portion or the mounting portion, and the inner member has a second distal end defining a ball joint connected to the anchoring portion or the mounting portion. The inner member telescopes within the internal through bore of the outer member. An internal through bore of the inner member and an internal through bore of the outer member align with each other to allow passage of the flexible elongate supply link from the anchoring portion to the mounting portion. A locking mechanism connects locking relative movement between the inner member and the outer member.

8 Claims, 4 Drawing Sheets

(56) References Cited

U.S. PATENT DOCUMENTS

| | | | |
|---|---|---|---|
| 2013/0247919 A1* | 9/2013 | Chauvette | A61B 90/14 128/845 |
| 2014/0208514 A1* | 7/2014 | Schuerch, Jr. | A61G 13/1245 29/428 |
| 2015/0374117 A1* | 12/2015 | Lozano | F16M 11/32 248/447.2 |
| 2016/0151920 A1* | 6/2016 | Nakata | F16M 11/2078 901/29 |
| 2018/0056871 A1* | 3/2018 | Karner | H04N 7/181 |
| 2019/0118378 A1* | 4/2019 | Ludban | B25J 17/0275 |
| 2019/0160691 A1* | 5/2019 | O'Connor | B25J 15/0061 |
| 2020/0147783 A1* | 5/2020 | Crawford | B25J 9/102 |
| 2020/0246984 A1* | 8/2020 | Lin | B25J 19/0041 |
| 2020/0338758 A1* | 10/2020 | Schultz | B25J 18/025 |

\* cited by examiner

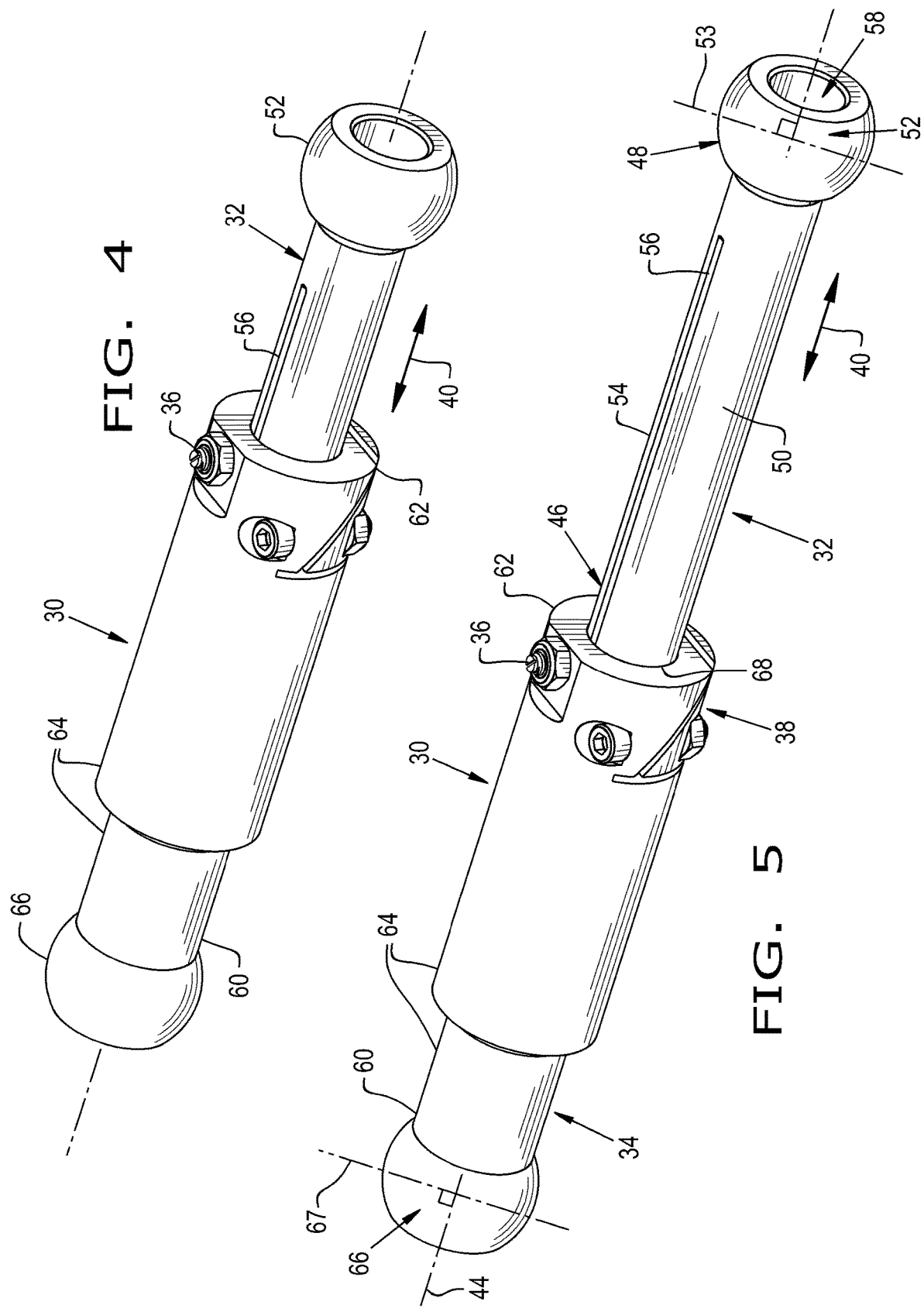

BOOM ARM FOR POSITIONING AN AUXILIARY ELECTRICAL DEVICE

BACKGROUND OF THE INVENTION

1. Field of the Invention

The present invention relates to a boom arm, and, more particularly, to a boom arm assembly for positioning auxiliary electrical devices.

2. Description of the Related Art

Auxiliary electrical devices can be used in manufacturing and/or industrial environments to sense, view, illuminate, etc. various objects. Examples of such auxiliary electrical devices include sensors, cameras, lights, etc. Positioning structures used for positioning auxiliary electrical devices in manufacturing environments are known. Positioning structures can include such devices such as stands, brackets and rods which provide limited adjustability.

U.S. Pat. No. 9,415,520 (Sanders, et al.), which is assigned to the assignee of the present invention, discloses an end of arm tooling system for a robotic arm. The end of arm tooling system includes an arm of fixed length which can be pivoted and locked at a desired orientation using a ball and socket arrangement at the base of the tooling system. Using the robot, the particular type of end effector (such as a welder, clamp, light, etc.) mounted to the tooling system can be positioned at a desired location and orientation.

What is needed in the art is a positioning structure which simplifies the positioning of auxiliary electrical devices.

SUMMARY OF THE INVENTION

The present invention provides a positioning structure in the form of a boom arm assembly having ball joints at each end and a telescoping link interconnecting the ball joints.

The invention in one form is directed to a boom arm assembly for positioning an auxiliary electrical device relative to a fixed anchoring portion. The auxiliary electrical device is coupled with a flexible elongate supply link. The boom arm assembly includes an anchoring portion which is configured to attach to an anchoring surface. A mounting portion is configured to attach to the auxiliary electrical device. A telescoping link includes an elongated outer member and an elongate inner member. The outer member has an internal through bore and a first distal end, with the first distal defining a ball joint which is connected to the anchoring portion or the mounting portion. The inner member has an internal through bore and a second distal end, with the second distal end defining a ball joint connected to the anchoring portion or the mounting portion. The inner member is slidably positioned within the internal through bore of the outer member in a telescoping manner. The internal through bore of the inner member and the internal through bore of the outer member align with each other to allow passage of the flexible elongated supply link from the anchoring portion to the mounting portion. A locking mechanism connects and locks rotation between the inner member and the outer member.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 4 shows the boom arm of FIGS. 1 and 2 in a partially extended position; and FIG. 5 shows the boom arm of FIGS. 1-3 in a fully extended position.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION OF THE INVENTION

Figure 1:
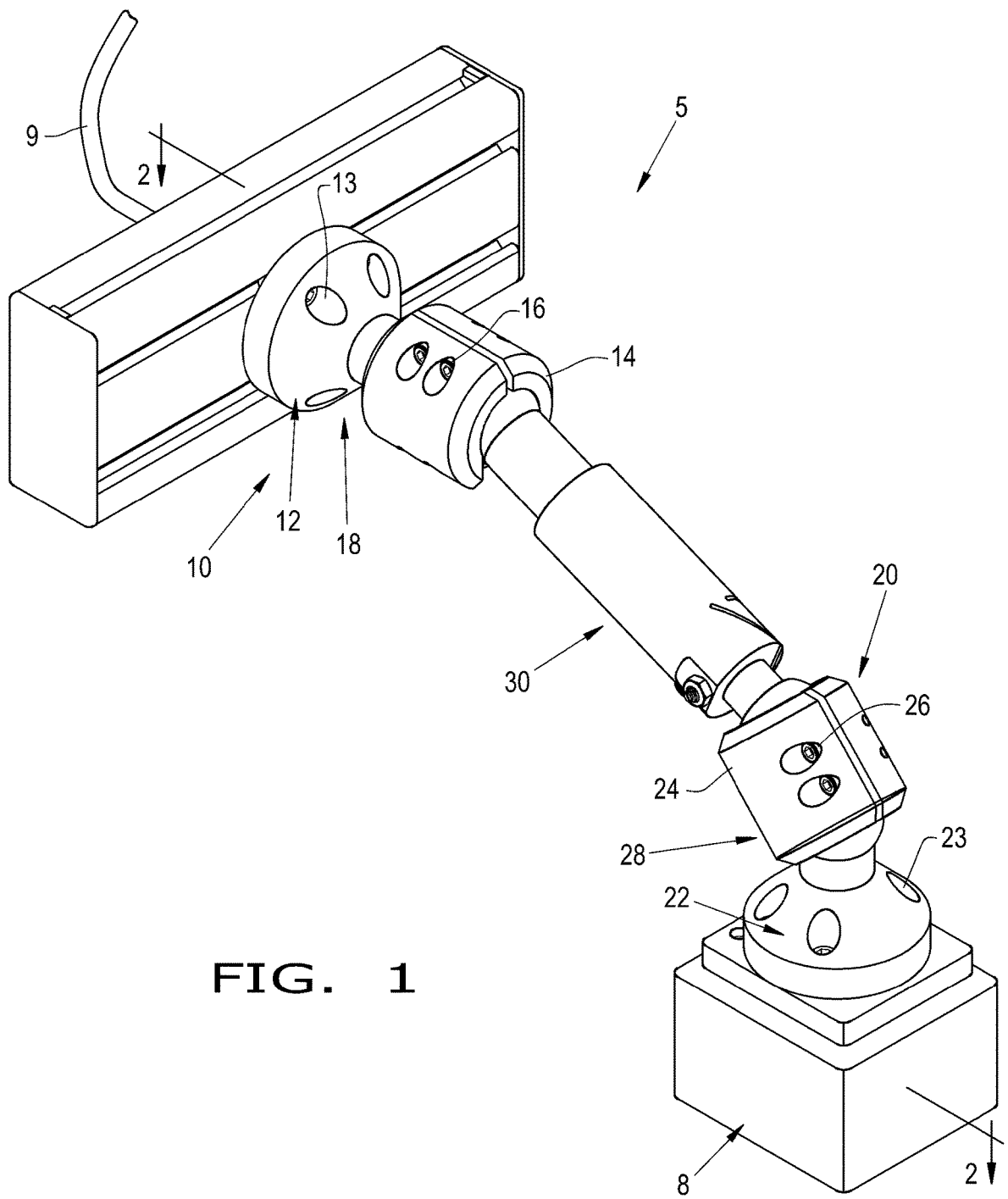
FIG. 1 is a perspective view of an embodiment of for a boom arm assembly for an auxiliary electrical device.

Referring now to the drawings, and more particularly to FIG. 1, there is shown a positioning structure in the form of a boom arm assembly 5 for positioning an auxiliary electrical device 8, represent schematically with a box in FIG. 1. The auxiliary electrical device 8 could be in the form of any electrical device used in a manufacturing or industrial environment for sensing, remotely viewing, illuminating various objects, etc. such as piece parts being made or assembled during a manufacturing process. Examples of such auxiliary electrical devices can include sensors, cameras, lights, optical scanners, etc.

The boom arm assembly 5 generally includes an anchoring portion 10, a mounting portion 20 and a telescoping link 30. The anchoring portion 10 includes a first ball base 12 connected to a first knuckle joint 14. The anchoring portion 10 is shown attached to an anchoring surface of an extruded aluminum beam or frame having slots contained therein, such as slotted frames for industrial and manufacturing purposes sold by 80/20, Inc. Columbia City, Ind. However, the anchoring portion could be another type of support structure, such as a conveyor frame, stand, table, machine base, etc. The first ball base 12 and the first knuckle joint 14 each have a longitudinally extending through-hole 15 (see FIG. 2) which allow a flexible elongate supply link 9 to pass therethrough toward the distal end of the boom arm assembly 5. Examples of flexible elongate supply links can include wires, cables, air lines, etc. associated with the auxiliary electrical device 8. The first ball base 12 has holes 13 or the like through which fasteners (not shown) may be inserted to attach the first ball base 12 to the anchoring portion 10.

The first knuckle joint 14 forms a cylindrical sleeve which partially covers the at least partial sphere of the first ball base 12. The first knuckle joint 14 has holes 16 or the like through which fasteners (not shown) may be inserted to tighten or loosen the connection between the first knuckle joint 14 and the first ball base 12. The first knuckle joint 14 defines at least one adjustable axis of rotation 18. The connection between the first ball base 12 and the first knuckle joint 14 may be rotatable or fixed. Furthermore, it is to be understood that the first base 12 end while shown as a spherical portion, may be made of any suitable shape for connection with the first knuckle joint 14.

The mounting portion 20 includes a second ball base 22 that is connected to a second knuckle joint 24. The mounting portion 20 may be attached to any type of auxiliary electrical device 8, as described above. The second ball base 22 and the second knuckle joint 24 each have a longitudinally extending through-hole 25 (see FIG. 2) which allow wires, cables, air lines, etc. to pass therethrough toward the distal end of the boom arm assembly 5. The second ball base 22 has holes 23 or the like through which fasteners (not shown) may be inserted to attach the second ball base 22 to the auxiliary electrical device 8.

The second knuckle joint 24 forms a cylindrical sleeve which partially covers an at least partial sphere of the second ball base 22. The second knuckle joint 24 has holes 26 or the like through which fasteners (not shown) may be inserted to tighten or loosen the connection between the second knuckle joint 24 and the second ball bases 22. The second knuckle joint 24 defines at least one adjustable axis of rotation 28. The connection between the second ball base 22 and the second knuckle joint 24 may be rotatable or fixed. Furthermore, it is to be understood that the second base 22 end while shown as a spherical portion, may be made of any suitable shape for connection with the second knuckle joint 24.

Figure 2:
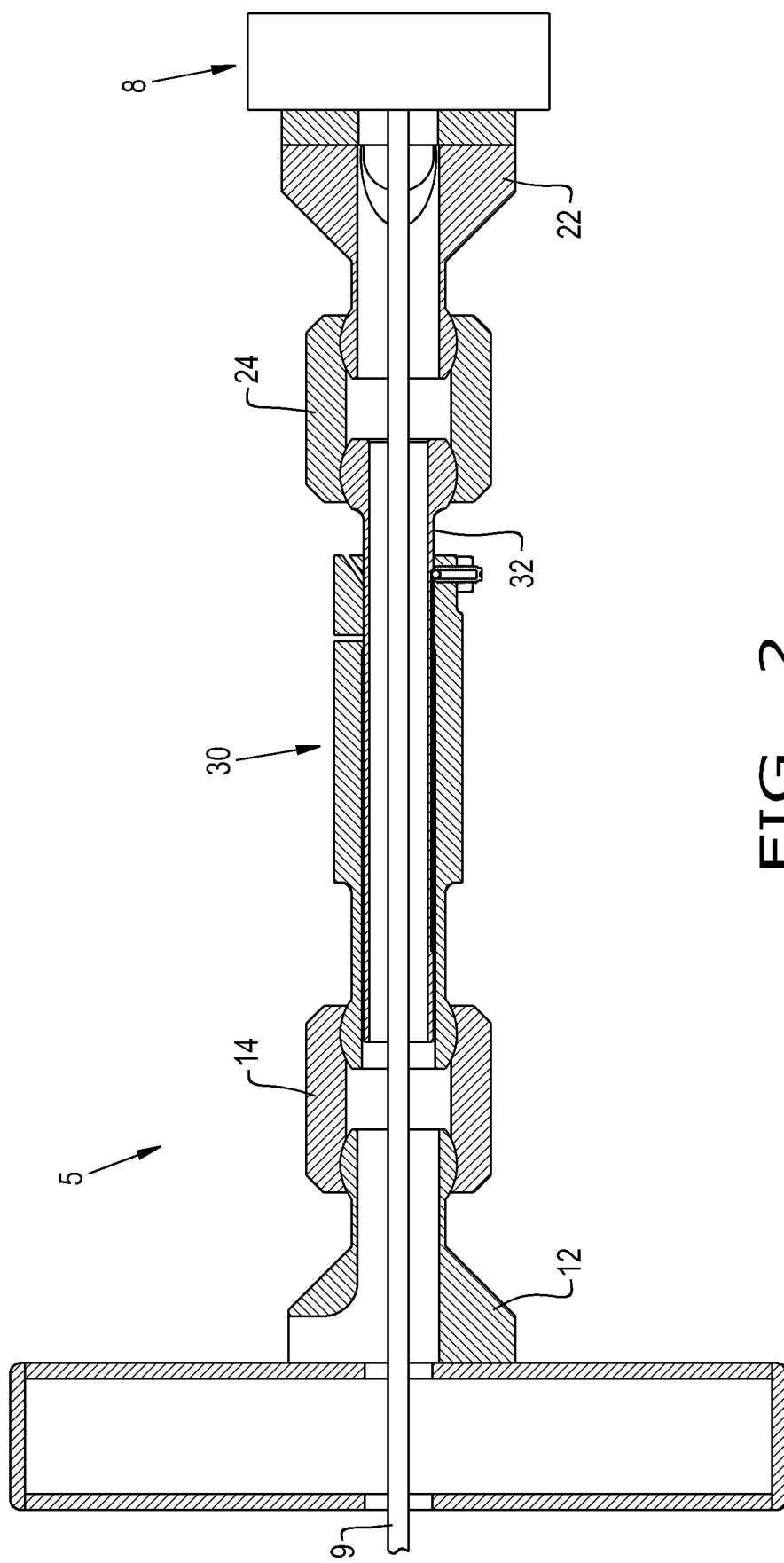
FIG. 2 is a longitudinal sectional view taken along 2-2 in FIG. 1.
Figure 3:
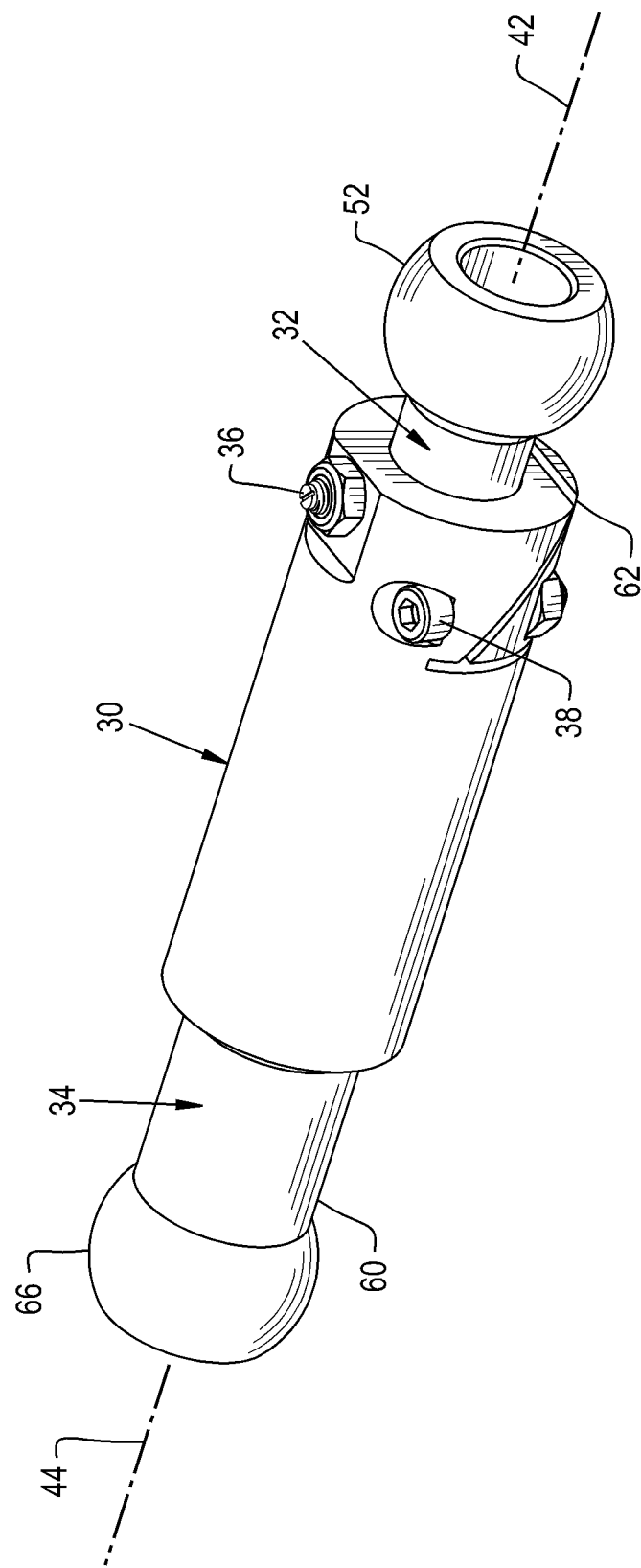
FIG. 3 is a perspective view of the boom arm of FIG. 1 in a retracted position.

Now referring to FIG. 2, the telescoping link 30 interconnects the anchoring portion 10 to the mounting portion 20 in a rotatable and slidable configuration. The telescoping link 30 can include an inner member 32, an outer member 34, an anti-rotation member 36, and a locking mechanism 38. The inner member 32 is slidably engaged with the outer member 34 and may slide in relation to each other back and forth along a sliding direction 40. The inner member 32 and the outer member 34 may have any number of positions including the retracted position as shown in FIGS. 1 and 3, a partial position as shown in FIG. 4 and a fully extended position as shown in FIG. 5. A longitudinal axis 42 of the inner member 32 is substantially parallel to a second longitudinal axis 44 of the outer member 34 when the inner member 32 and outer member 34 are slidably engaged with one another. This arrangement advantageously allows a user to easily adjust an auxiliary electrical device 8 to any desired orientation relative to and distance from the anchoring portion 10.

Referring now to FIG. 5, the inner member 32 includes a first end 46 and a second end 48 with an extension 50 extending from the first end 46 to the second end 48. The inner member 32 may be made from any material suited to withstand tensile, compressive and/or impact forces along and traverse to the longitudinal axis 42 while providing sufficient wear and chemical resistance. Typical materials include but are not limited to plastics, e.g. acrylonitrile butadiene styrene (ABS), nylon, polyether ether ketone (PEEK) or polyethylene terephthalate (PET). Typical material may also include metals, e.g. steel, aluminum, cast iron, plastic, etc. The extension 50 while shown as having a cylindrical shape may have any shape suitable for a slidable engagement with the outer member 34. The extension 50 further includes an at least partial sphere 52 disposed at the second end 48 and having a center axis 53 running through a central portion and traverse to the longitudinal axis 42. The at least partial sphere 52 may make up any portion of a sphere but is generally shaped and sized to function as a ball joint with a knuckle joint. A typical size of the at least partial sphere 52 may be 1.25" if configured for English units and 28.5 mm if configured for SI units. It is to be understood that the at least partial sphere 52 may be of any suitable size for use with a knuckle joint but is generally configured to provide 160 degrees of rotation without pinching any cables, lines or any other type of link that passes through the joint.

An outer surface 54 of the extension 50 extends from the at least partial sphere 52 to the first end 46. The outer surface 54 may be a smooth or rough and may have a cross section consistent or varying along its' length. The outer surface may include at least one anti-rotation groove 56 that is substantially parallel to the longitudinal axis and is configured to engage with the anti-rotation member 36. While the anti-rotation member 36 is engaged with the at least one anti-rotation groove 56, the inner member 32 and the outer member 34 cannot rotate independently of each other about the longitudinal axis 42 or the second longitudinal axis 44. The inner member also includes an internal through bore 58 that can be configured to allow wires, cables, lines, etc. to pass therethrough.

Outer member 34 includes a third end 60 and a fourth end 62 with a second extension 64 extending from the third end 60 to the fourth end 62. The outer member 34 may be made from any material suited to withstand tensile, compressive and/or impact forces along and traverse to the longitudinal axis 42 while providing sufficient wear and chemical resistance. Typical materials include but are not limited to plastics, e.g. acrylonitrile butadiene styrene (ABS), nylon, polyether ether ketone (PEEK) or polyethylene terephthalate (PET). Typical materials may include metals, e.g. steel, aluminum, cast iron, plastic, etc. The second extension 64 while shown having a cylindrical shape with two separate diameters may have a single diameter along the length or have any suitable shape. An at least partial second sphere 66 is disposed at the third end 60 and has a second center axis 67 running through a central portion and traverse to the second longitudinal axis 44. The at least partial second sphere 66 may make up any portion of a sphere but is generally shaped and sized to function as a ball joint with a knuckle joint. A typical size of the at least partial second sphere 66 may be 1.25" if configured for English units and 28.5 mm if configured for SI units. It is to be understood that the at least partial second sphere 66 may be of any suitable size for use with a knuckle joint but can be generally configured to provide 160 degrees of rotation without pinching any cables, lines or any other type of link that passes through the joint.

An outer surface 68 of the second extension 64 extends from the at least partial second sphere 66 to the fourth end 62. The outer surface 68 may be a smooth or rough and may have a cross section that is constant or varied along it's length. The outer member 34 also includes a second internal through bore 70 that is configured to allow the inner member 32 to slidably engage with the outer member 34. The outer member 34 further includes a locking mechanism 38 disposed at the fourth end 62 and is configured to prevent slidable movement of the inner member 32 and the outer member 34 relative to one another along the slidable direction 40. The locking mechanism 38 is shown as a socket head cap screw and nut being used to clamp a portion of the forth end against the inner member 32. However, the locking mechanism 38 may be of any type of lock suitable to prevent slidable movement of the inner member 32 and the outer member 34 relative to one another, e.g., collar lock, set screw or clutch.

The anti-rotation member 36 is located near the fourth end 62 and is configured to engage the at least one anti-rotation groove 56 of the inner member 32 thereby preventing a rotation of the inner member 32 relative to the outer member 34. The anti-rotation member 36 is shown as a spring ball lock but may also include any other type of structure, e.g. spring pin or detent pin, that may engage with the at least one anti-rotation groove 56. The anti-rotation member 36 advantageously provides that a mountable device is prevented from rotating about the longitudinal axis 42 when a rigid position is required. The anti-rotation member 36 may also be disengaged with the at least one anti-rotation groove 56 thereby allowing rotation of the inner member 32 relative to the outer member 34.

For the illustrated embodiment, when the telescoping link 30 is in a retracted position, it may have a distance between the center axis 53 of the inner member 32 and the second center axis 67 of the outer member 34 of approximately 6 in. The flexible link 30 may be moved from the retracted position to an extended position of approximately 10 in. It is to be understood that the flexible link 30 may be adjusted to any dimension between the retracted position and extended position and may be further provided with retracted positions and extended positions that are smaller or larger than previously stated dimensions. Dimensions selected for the retracted position and the extended position are impacted by many factors such as the weight of the auxiliary electrical device 8, the stability of the anchoring portion 10, materials of construction, and angle of use of the boom arm assembly 5. The dimension of the retracted and extended positions may be further impacted by environmental impacts such as wind and vibration.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A boom arm assembly for positioning an auxiliary electrical device relative to a fixed anchoring portion, the auxiliary electrical device coupled with a flexible elongate supply link, the boom arm assembly comprising:
   an anchoring portion configured to attach to an anchoring surface;
   a mounting portion configured to attach to the auxiliary electrical device;
   a telescoping link including an elongate outer member and an elongate inner member, wherein:
      the outer member has an internal through bore and a first distal end, the first distal defining a ball joint which is connected to one of the anchoring portion or the mounting portion, the outer member including an anti-rotation member; and
      the inner member has an internal through bore and a second distal end, the second distal end defining a ball joint connected to the other of the anchoring portion and the mounting portion, the inner member being slidably positioned within the internal through bore of the outer member in a telescoping manner, the internal through bore of the inner member and the internal through bore of the outer member aligning with each other to allow passage of the flexible elongate supply link from the anchoring portion to the mounting portion, the inner member including a longitudinally extending anti-rotation groove, the anti-rotation member removably engaging the longitudinally extending anti-rotation groove; and
   a locking mechanism being connected with and configured for locking relative movement between the inner member and the outer member.

2. The boom arm assembly of claim 1, wherein the anti-rotation member is a spring ball lock.

3. The boom arm assembly of claim 1, wherein the anchoring portion and the mounting portion each include a ball joint.

4. The boom arm assembly of claim 3, wherein the anchoring portion is connected to the telescoping link via a first knuckle joint, and the mounting portion is connected to the telescoping link via a second knuckle joint.

5. The boom arm assembly of claim 4, wherein the first knuckle joint interconnects the ball joint of the anchoring portion with the ball joint at the first distal end or the second distal end of the telescoping link, and the second knuckle joint interconnects the ball joint of the mounting portion with the ball joint at the opposite of the first distal end or the second distal end of the telescoping link.

6. The boom arm assembly of claim 3, wherein the anchoring portion ball joint and the mounting portion ball joint are each configured to provide 160 degrees of rotation.

7. The boom arm assembly of claim 3, wherein the anchoring portion ball joint and the mounting portion ball joint each have a diameter of approximately 1.25 inches.

8. The boom arm assembly of claim 1, wherein the outer member and the inner member move between a fully retracted position and a fully extended position.

\* \* \* \* \*